TOTAL INTERNAL REFLECTION PROJECTION SYSTEM

Filed Sept. 11, 1962 4 Sheets-Sheet 1

INVENTOR:
MILTON L. NOBLE,
BY Marvin A. Goldenberg
HIS ATTORNEY.

TOTAL INTERNAL REFLECTION PROJECTION SYSTEM

Filed Sept. 11, 1962 4 Sheets-Sheet 2

INVENTOR:
MILTON L. NOBLE,
BY Marvin A. Goldenberg
HIS ATTORNEY.

INVENTOR:
MILTON L. NOBLE,
BY Marvin A. Goldenberg
HIS ATTORNEY.

INVENTOR:
MILTON L. NOBLE,
BY [signature]
HIS ATTORNEY.

United States Patent Office 3,357,299

Patented Dec. 12, 1967

3,357,299

TOTAL INTERNAL REFLECTION PROJECTION SYSTEM

Milton L. Noble, Liverpool, N.Y., assignor to General Electric Company, a corporation of New York Filed Sept. 11, 1962, Ser. No. 222,344
11 Claims. (Cl. 88—24)

The present invention relates to a novel light projection system primarily adapted for use with deformable recording media. In particular the invention relates to a novel total internal reflection projection system primarily for use with transparent deformable recording media, such as an oil film or thermoplastic tape, capable of providing an enlarged display of high brightness and high resolution, and which at these conditions obtains substantial improvement over conventional phase demodulation systems. The invention, in addition, can be employed with other forms of recording media which provide phase and density modulation of projected light. The term "recording" is employed herein in the context of denoting the impressing of information for subsequent reproduction, in general, and is not necessarily intended to signify a preservation of the information for any appreciable period.

In present day practice information recorded on deformable recording media are normally projected onto an enlarged display surface by phase demodulation projection systems, also commonly referred to as Schlieren projection systems. These systems require a first bar and slit arrangement disposed between the projection light source and the recording medium and a second bar and slit arrangement disposed between the recording medium and the display screen. The systems lenses image light transmitted through the slits of the first bar and slit arrangement onto the opaque bar portions of the second bar and slit arrangement, given an undeformed state of the recording medium. When the medium is deformed in accordance with an input information, light transmitted therethrough will be deflected so as to be selectively transmitted through the slits of the second bar and slit arrangement in accordance with the deformation applied to the medium. In addition, the system lenses focus the light transmitted through the recording medium onto the display screen so as to provide an image of the recorded object. Although quite adequate for many applications, Schlieren projection systems are often unsuitable for bright displays since illumination efficiency is low. In addition, these systems are unsatisfactory for many dynamic type displays because the components of the recording system tend to interfere with those of the optical system.

Accordingly, one object of the present invention is to provide a novel light projection system which overcomes a number of limitations inherent in conventional phase demodulation projection systems.

Another object of the present invention is to provide a novel light projection system that obtains substantial improvement in brightness of highly resolved displayed images over that obtained by conventional phase demodulation projection systems.

Another object of the present invention is to provide a novel light projection system for use with deformable recording media for providing large area, high resolution displays under conditions of high ambient lighting.

Another object of the present invention is to provide a novel light projection system for use with deformable recording media providing a dynamic display of electrically recorded information wherein the optical components of the system can be readily situated so as to not interfere with the electrical components of the recording means.

A further object of the present invention is to provide a novel light projection system having the above recited characteristics which can be employed to provide a superimposed display of multiple recorded objects.

A still further and more specific object of the present invention is to provide a novel light projection system as above described which has application to phase and density modulating recording media and which employs the principle of internal reflection in an optical construction that provides an efficient light transmission and minimizes unwanted reflections within the system.

Briefly, these and other objects of the invention are accomplished in a projection system employing a light modulating control medium having a first surface and an opposing base surface, said first surface providing a boundary between said control medium and a second medium having a index of refraction lower than said control medium. Light emitted from a light source is transmitted through the base surface of said recording medium at an angle which provides selective internal reflection of said light at said boundary in accordance with the modulations of said medium. The reflected light which may contain both phase and amplitude information is collected and projected onto a display surface.

In accordance with one specific embodiment of the invention in which a surface deformable recording medium is employed, a prism is provided having an index of refraction approximately equal to that of the recording medium, with the recording medium overlaying a surface of said prism that is oblique with respect to incident light. The emitted light is transmitted through an entrance surface of the prism at an angle normal to said entrance surface and strikes the deformable recording surface at an angle in the region of the critical angle so as to be selectively reflected and refracted at the recording surface. The reflected portion of the light is directed through the prism exit surface and projected onto the display surface by a correction lens assembly which corrects for off axis projection. A spatial filter is provided in the correction lens assembly for accomplishing a demodulation of the phase modulated information in the reflected light and thereby enhancing the contrast of the displayed information.

In accordance with another aspect of the invention, a prism configuration is provided having additional oblique surfaces for selectively reflecting and refracting the light reflected from the recording surface so as to further improve the contrast of the projected image.

In accordance with a further aspect of the invention, two recording objects can be simultaneously projected by a light source onto a display surface as superimposed images. An eight-sided prism having a bisecting interference filter layer is employed with a first recording medium overlaying a first oblique surface of said prism and a second recording medium overlaying a second oblique surface. The projection light enters the prism and is split by the interference filter so that half of its energy is modulated by the first recording medium and half by the second medium. Energy reflected from the two recording media is combined and projected by a correction lens assembly.

While the specification concludes with claims particularly pointing out and distinctly claiming the subject matter which is regarded as the invention, it is believed that the invention will be better understood from the following description taken in connection with the accompanying drawings in which:

Figure 1:
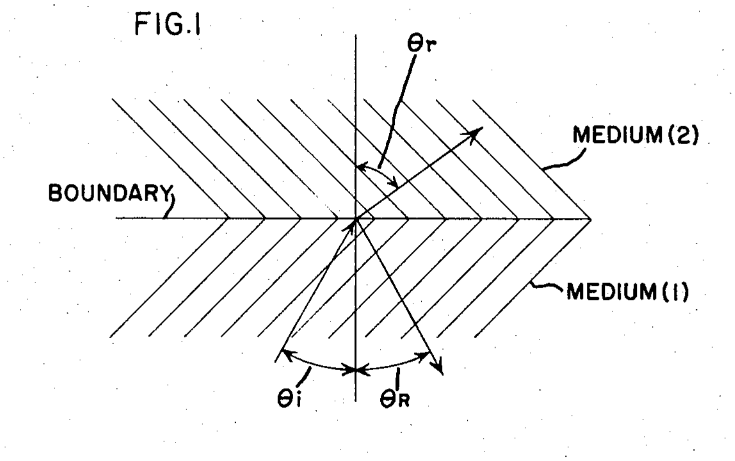
FIGURE 1 illustrates certain optical principles that are of aid in describing the present invention.

The total internal reflection projection system of the present invention will be more readily understood if first we consider the phenomenon of a beam of light travelling from a first transparent medium of density $n_1$ through a second transparent medium of density $n_2$, where $n_1>n_2$. Light striking the boundary between the two media at some angle of incidence greater than zero degrees will be partially transmitted through the boundary and partially reflected. Light passing through the boundary is seen to be changed in direction, which is a gross effect known as refraction. The angle of refraction will be greater than the angle of incidence. This phenomenon is illustrated in FIGURE 1. The relative index of refraction $n_{12}$ of the first medium 1 relative to the second medium 2 is defined as the ratio of the speed of light $v_2$ in the second medium to its speed $v_1$ in the first medium and may be represented in accordance with Snell's law as $$\frac{\sin \theta_r}{\sin \theta_i}=\frac{v_2}{v_1}=n_{12} \qquad (1)$$

where $\theta_i$ is the angle of incidence and $\theta_r$ is the angle of refraction. If the angle of incidence $\theta_i$ is made large enough, it will be found that at some particular angle, termed the critical angle, the refracted light will be in the direction of the plane of the boundary, at $$\theta_r=\frac{\pi}{2}$$

Figure 2A:
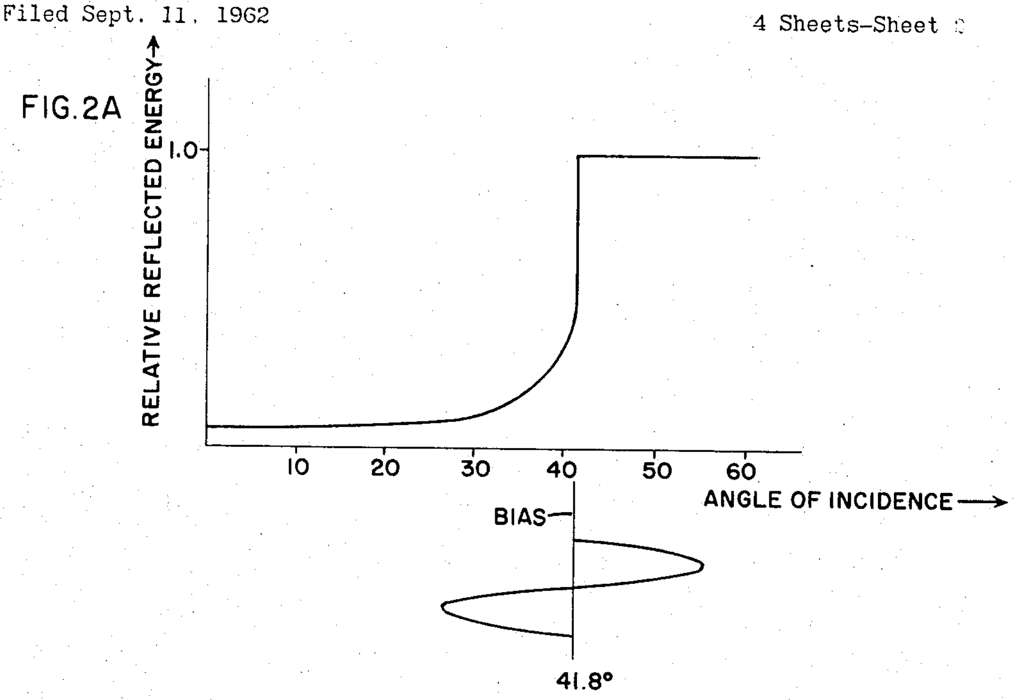
FIGURES 2A and 2B are graphs employed in describing the invention.

For this condition the refracted beam essentially ceases to exist and only the reflected beam remains. Thus, at the critical angle and angles greater than critical, the incident light upon striking the boundary will be entirely reflected, the angle of reflection $\theta_R$ being equal to the angle of incidence $\theta_i$. The characteristic of relative reflected light energy vs. angle of incidence is illustrated in FIGURE 2A. From this figure it may be seen that for small angles of incidence very little of the incident light is reflected at the boundary, the majority of the light being transmitted through. Upon approaching the critical angle increasingly more of the incident light is reflected, with total reflection occurring at the critical angle and greater.

Accordingly, if the surface of the boundary should be altered, various angles of incidence for impinging light can be effected so that light is selectively reflected and refracted at the boundary in accordance with the boundary configuration. Thus, information applied so as to be contained in surface deformations of the boundary may be derived by retrieving the reflected portion of the light.

Figure 3:
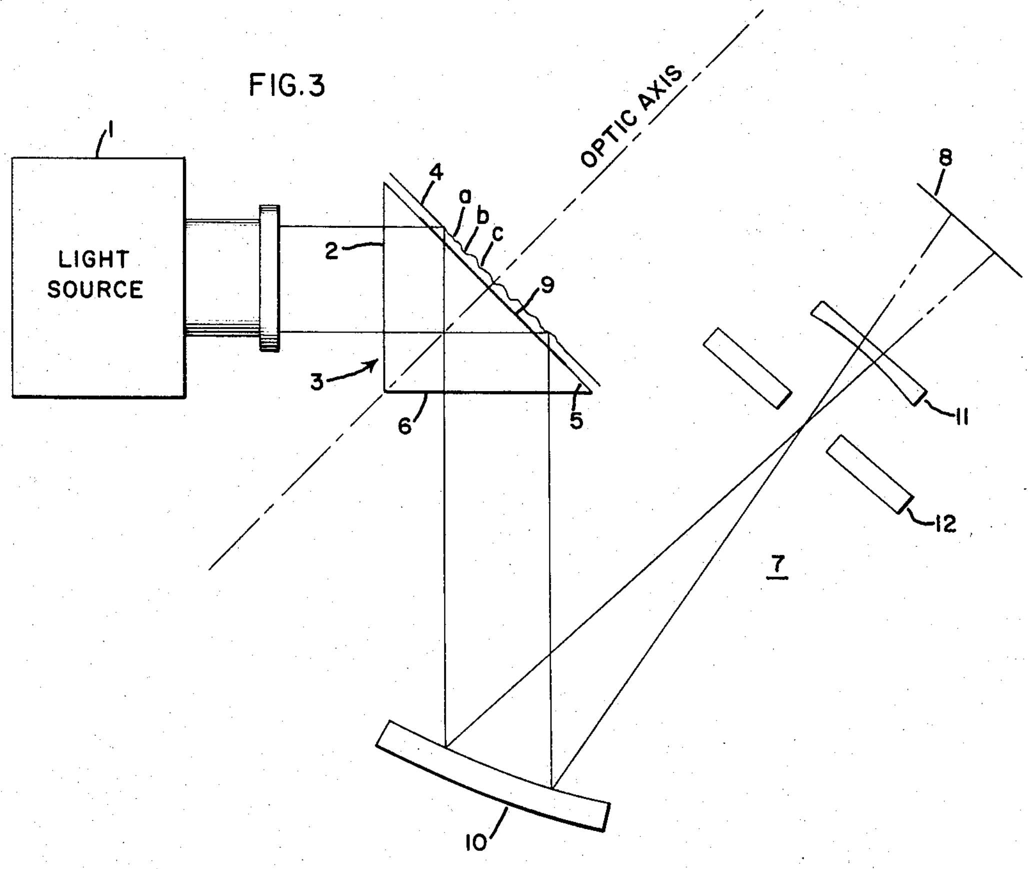
FIGURE 3 illustrates one embodiment of a light projection system in accordance with the invention.

Referring now to FIGURE 3, there is shown a single embodiment of a total internal reflection projection system in accordance with the invention, the operation of which is based upon the above described principles. The present system provides an enlarged display characterized by high brightness and high resolution. For example the system is capable of providing an enlarged display having in excess of 2½ lumens of luminous flux per watt of source energy with a resolution of at least 1500 lines. Light from a light source 1 is projected substantially normal to the entrance surface 2 of a transparent three sided prism 3 and upon being transmitted therethrough strikes the external recording surface of a transparent deformable recording medium 4 which overlays and adheres to the oblique hypotenuse surface 5 of the prism 3. The index of refraction $n$ of the recording medium 4 is closely matched by that of the prism 3 so as to avoid reflection effects at their interface. The light energy is selectively reflected and refracted at the recording surface of the medium 4 in conformance with the surface deformations thereof. That portion of the light which is reflected passes through the opposing exit surface 6 of the prism and is collected by a correction lens assembly 7 which projects the reflected light onto a display surface 8.

The transparent deformable recording medium 4 may be, for example, an oil film or a softenable thermoplastic member. If a thermoplastic member is employed, an oil coating between said member and prism surface provides the necessary adherence between surfaces. The recording surface of the medium 4 is deformed in accordance with some input information commonly applied by means of a modulated electrical surface charge. For deformations applied in this manner, the hypotenuse surface 5 has deposited thereon a transparent conductive coating 9, e.g., of evaporated chromium or cuprous iodide, which acts as a ground plane for the charge distribution on the overlaid recording medium. Thus, electric field forces are established on the surface of the recording medium providing a deformation of said surface.

Source 1 may be a conventional component emitting light of a desired intensity and collimation. A suitable high brightness source may include a standard 1600 w. xenon arc lamp in combination with conventional collimator lenses. The prism 3 is preferably constructed and positioned so that light emitted from source 1 strikes the undeformed surface portions of the recording medium at the critical angle, or a few degrees greater than critical. The reason for this will be explained presently. In addition, the configuration of the prism is preferably such that light reflected from the undeformed surface portions is transmitted through the exit surface 6 of the prism at an angle normal to this surface. The critical angle is determined by the index of refraction $n$ of the recording medium. In one operating embodiment a recording medium having an index of refraction $n$ of 1.5 was employed which provides a critical angle of approximately 41.8°. The prism 3 may be composed of a suitable vitreous or plastic material whose index of refraction is approximately matched to that of the recording medium. It may be appreciated that employment of the prism 3 allows light to be incident at the boundary of the recording surface at the desired angle while substantially avoiding undesirable reflections at any other boundary.

The correction lens assembly 7 is for the purpose of minimizing distortion in the displayed image which receives the light reflected from the recording surface at relatively wide angles and projects the recorded information onto a display area that is located in a plane perpendicular to the optic axis. It may be appreciated that should light reflected from the oblique recording surface be projected directly to a display screen by a standard projection lens off axis distortion would result. In addition, because the recording surface is oblique a lens having an extreme depth of focus would be required. The correction lens assembly 7 includes a segmental concave spherical mirror 10, a transparent corrector plate 11, which is a form of Schmidt lens for correcting spherical aberrations of the mirror 10, and an apertured mask 12. The corrector plate 11 is an aspherical-plano lens positioned in the plane of the center of curvature of spherical mirror 10. The apertured mask 12 which, as will be described, is a form of spatial filter positioned approximately in a plane of the focal point of the mirror 10. Typically, the dimensions of the aperture correspond to the dimensions of the light source image in the region of focus. Thus, the aperture provides a demodulation of the phase modulated information in the reflected light and substantially improves the contrast of the projected image.

As previously stated, the information to be projected may be recorded in the form of an electrical charge pattern which exerts differential forces on the surface for deforming same. This may be accomplished by an in-air charge transfer process from a photoconductive plate or by an electron beam writing process. One typical in-air charge transfer process employs a photoconductive plate, a corona discharge device and a transfer voltage source. A uniform charge is first applied to the surface of the photoconductive plate by the corona discharge device and upon exposure to information in the form of light energy, the elemental resistivity of the photoconductor is changed drawing charge selectively from elemental portions of the surface in correspondence with the intensity of the applied light. The remaining differential charge pattern corresponding to the light information input is transferred to the surface of the recording medium by bringing the photoconductive plate and the recording medium 3 into close proximity and applying a transfer voltage between the two. The recording medium in its softened condition will respond to the surface forces created by the transferred charge pattern. A more detailed explanation of such recording process is described in a copending application by Sterling Newberry entitled, "Direct Image Transfer to Thermoplastic Tape," Ser. No. 862,249, filed Dec. 28, 1959, and assigned to the assignee of the present invention.

As may be readily appreciated, by use of the projection system of the present invention, the components of which are all located below the recording medium, the deformable surface of said recording medium is entirely accessible to the recording apparatus. Thus, interference between the optical components of the projection system and the electrical components of the recording system will not exist.

It may be appreciated that as a basic principle of operation of the projection system shown in FIGURE 3, the undeformed surface portions of the recording medium 4 should reflect a light intensity different from the light intensity reflected by the deformed surface portions. In addition, light reflected from the deformed surface portions should be in accordance with the angle of deformation. To provide a maximum display brightness it has been found preferable in one embodiment of the invention to have total internal reflection from the undeformed surface portions, producing maximum brightness on the projected screen 8 for these portions, and to proportionately subtract light from this maximum value at the deformed surface portions in accordance with the deformation angle. Accordingly, the area of the recording surface presenting a bright element of the recorded image will be undeformed, and the area of the surface representing a dark element of the image will have maximum deformation. It may be appreciated, however, that other forms of operation may also be employed where, for example, the undeformed surface areas represent a dark element or a gray element.

Figure 2B:
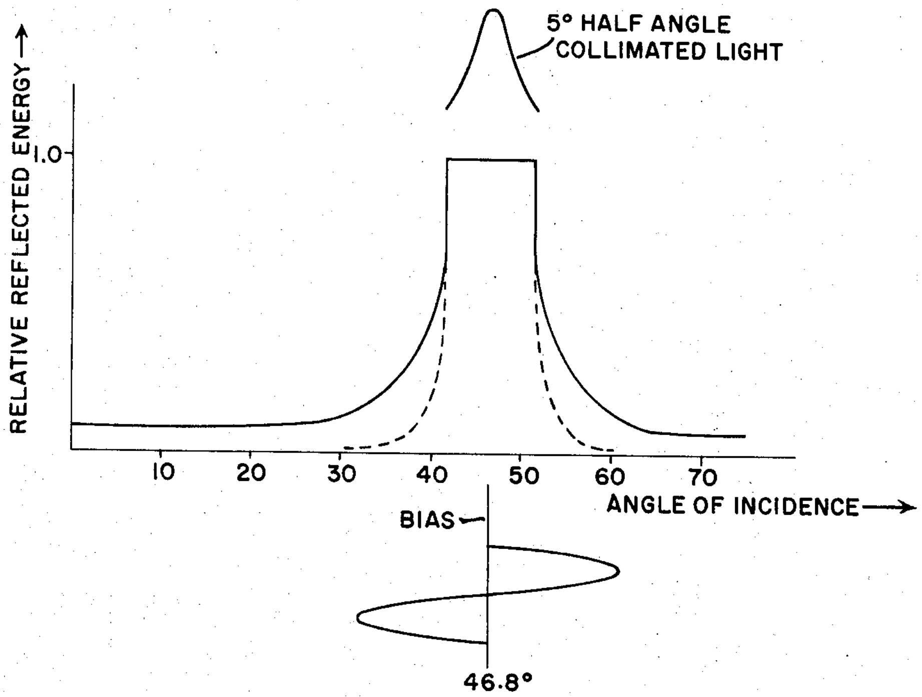

The above described preferred mode of operation may be readily obtained by providing a bias at approximately the critical angle, which means that the system is constructed and oriented so that light from source 1 strikes the undeformed portions of the recording surface at approximately the critical angle. For perfectly collimated light, which actually cannot feasibly be obtained, the bias point should be at precisely the critical angle, as shown in FIGURE 2A. It will be shown that a moderately collimated light of limited spatial bandwidth is actually desired for obtaining maximum brightness of display. For moderately collimated light the bias point should be set above the critical angle so that the lower end of the spatial band is at critical, as illustrated in FIGURE 2B. FIGURE 2B, which also illustrates a double intensity modulation characteristic for reflected energy, will be referred to again when considering the embodiments of FIGURES 6 and 7.

For purposes of explanation, reference is first made to FIGURE 2A and a perfectly collimated light. If the maximum obtainable deformation of the recording surface is 15°, conventional for presently developed oil films, the angle of incidence will accordingly swing 15° to either side of the bias since for each elemental deformation there will be created a positive and negative slope. These slopes are shown in an enlarged view of the recording surface in FIGURE 4. The elemental deformable areas shown in FIGURE 4 correspond to the points *a*, *b* and *c* of FIGURE 3. It is noted that in actual practice the slopes assume more of a sinusoidal configuration for which the principles of operation are essentially the same as herein described. A swing below the bias point may be appreciated to provide reflected energy from the negative slopes and a swing above the bias point provides reflected energy from the positive slopes. The reflected energy from each negative slope comprises both an intensity modulation and a phase modulation of the reflected light. The phase modulation is manifested in the deviation angle of the reflected light and the intensity modulation is manifested in the ratio of the reflected to refracted light at the boundary. The reflected energy from each positive slope comprises only a phase modulated information since all light from such slopes is internally reflected. Thus, if all of the reflected light were to be projected onto the display surface 8, the information contained in the light would be provided by only the intensity modulation from the negative slope portions and the light from the positive slope portions would contribute no information at all but be merely noise. The latter would add to the brightness level of the display but would not contribute to the information contained in the display. The apertured mask 12 which has been said to be essentially a spatial filter, acts to demodulate the phase information in the reflected light, thereby improving the contrast of the displayed image and reducing noise. The aperture also permits the employment of an uncollimated light source, as will be explained subsequently.

In addition, it may be noted that because of the constructional and optical geometry of the system, for each elemental deformed area the majority of the incident light energy will always be upon the negative slope portion. This is a fortunate characteristic of the system which acts to improve the contrast and quality of the projected image.

Figure 4:
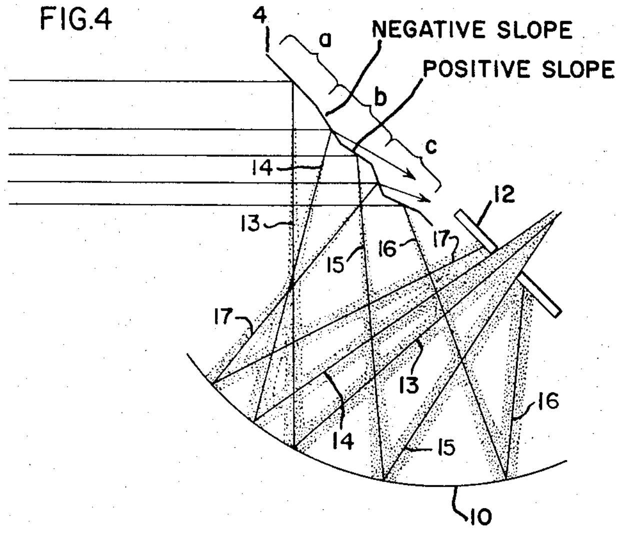
FIGURE 4 is a greatly enlarged side view of a segment of a deformed recording medium such as may be employed in the various embodiments of the invention.

Elemental areas *a*, *b* and *c* on the recording surface of the medium 3 represent the elemental areas of three different intensities of light information as best seen in FIGURE 4. Element *a* is an undeformed elemental area and corresponds to a bright element. Element *b* is intermediately deformed, e.g., at a 7° deformation angle, corresponding to a gray element and element *c* is maximumly deformed, e.g., at a 15° deformation angle, corresponding to a dark element. The light incident upon element *a* is said to be at about the critical angle and is totally reflected. As shown in FIGURE 4 by light ray 13 substantially all of this light is transmitted through the aperture of mask 12 to be projected onto the screen, not shown. The solid lines of the illustrated light rays indicate collimated light and the shaded areas indicate off collimation light. To simplify the drawing, the uncollimated components are not illustrated for the incident or refracted light. Also, since an enlarged view of the recording surface is shown the dimensions and spacings of the illustrated components are not in true perspective. The light incident upon the negative slope of element *b* is at an angle less than critical and is partially refracted and partially reflected in accordance with the deformation angle of the slope. In addition, the reflected light is deviated, in accordance with the surface deformation, at the recording surface boundary (and further at the exit surface of the prism due to refraction) such that only a portion of the light passes through the aperture of mask 12 to be projected onto the screen, as shown by light ray 14. The light incident upon the positive slope of the element *b* may be seen to be at an angle greater than critical and the totally reflected light from the positive slope, as shown by light ray 15, is seen to be deviated so that only a portion of this light passes through the aperture. Accordingly, the light projected onto the screen from element *b* is of less intensity than that from *a* as a function of the surface deformations. The light incident upon the negative slope of element *c* is at an angle considerably less than critical so that only a small fraction of the incident light is reflected. In addition, the light reflected from both the positive and negative slopes of *c*, as shown by light rays 16 and 17, is seen to be deviated at a relatively large angle so that essentially all of this light is blocked and none passes through the aperture of mask 12. Accordingly, the light from element *c* appearing on the screen is of extremely low intensity.

The change in deviation angle of light reflected from the surface of the recording medium 4 may be seen to be twice that of the change in the surface deformation angle because of the reflective nature of the projection. This may be compared to conventional transmitted light projection systems where the change in deviation angle is of the same order as the change in deformation angle. Accordingly, by employing a spatial filter to demodulate the phase information in the reflected light, such as the mask 12, the present system obtains a substantial improvement in sensitivity over the conventional projection systems.

The improvement in sensitivity of the present system also permits the employment of a light source having relaxed collimation constraints. Since the efficiency of a light source is inversely related to its collimation, a source of moderately collimated light, e.g., a 5 to 10° half angle collimation is preferably employed which intrinsically emits more light energy than does a highly collimated source, and in the present system adds appreciably to the highlight brightness of the display. A collimation half angle of approximately 5° at the recording surface, corresponding to a slightly higher half angle collimation at the source, since slight collimation occurs due to refraction effects at the prism input surface, is illustrated in FIGURE 2B. The usual disadvantage associated with an uncollimated light source is the introduction of noise due to the off collimation light components. Proper adjustment of the aperture of mask 12, however, substantially filters out such noise and yet provides a high display brightness of good image contrast, e.g., a contrast ratio of 10:1 between brightened and unbrightened areas for zero ambient screen illumination. Thus, the aperture opening is normally adjusted to be only as wide as necessary to pass the spatial band of uncollimated light reflected from the undeformed recording surface areas. Only portions of the light from the deformed areas will then be passed. Contrast of the projected image can be increased by narrowing the aperture, although this will decrease the display brightness. The aperture dimensions therefore determine the effective collimation angle of the projected light. In summary, it may be stated that the effective collimation angle is directly related to display highlight brightness, and the ratio of the maximum deformation angle of the recording surface to the effective collimation angle is directly related to the contrast of the projected image.

In a modified embodiment of the system shown in FIGURE 3, the biasing point is established at an angle exceeding the critical angle by at least the maximum deformation angle of the recording medium. Thus, all the light striking the recording surface of the recording medium is internally reflected, the reflected light containing only phase modulated information. As before, the aperture of mask 12 provides a demodulation of the internally reflected light. This modified embodiment is of advantage in applications where it may be undesirable for any portion of the projected light to be transmitted through the recording surface, e.g., where the photoconductor used in recording of an image is subject to disturbance by such spurious light energy.

Figure 5:
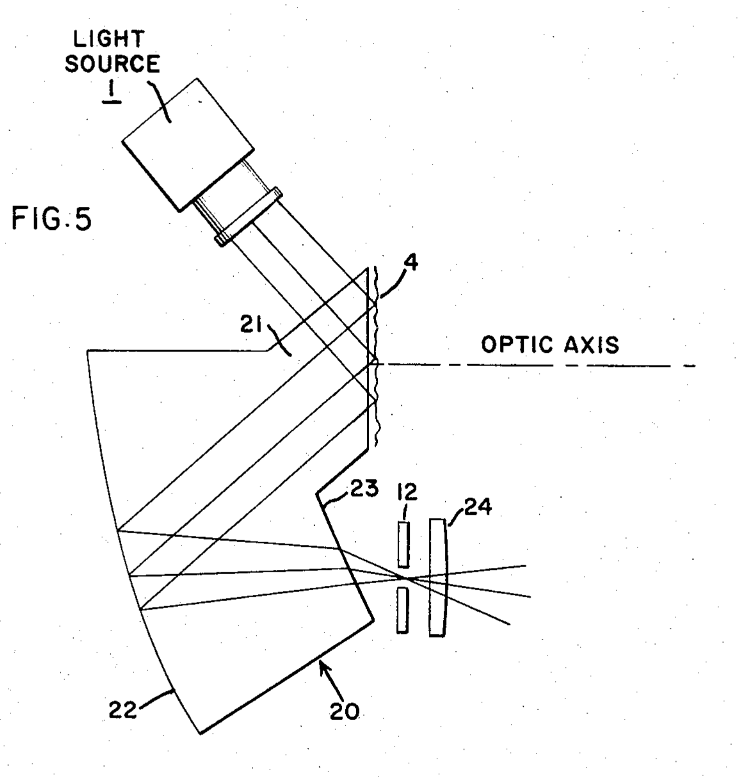
FIGURE 5 illustrates a modified embodiment of the system of FIGURE 3.

A preferred construction of the prism and correction lens assembly of the system of FIGURE 3 is illustrated in FIGURE 5. The illustrated construction is capable of focusing with a minimum of distortion reflected light incident upon the surface of mirror 22 at wide angles. Member 20 provides a solid construction including a prism portion 21 and segmental concave spherical mirror 22. The exit surface 23 of member 20, which is a segmental convex spherical surface, and a plano-concave spherical corrector plate 24 correct for spherical aberration of mirror 22. The centers of curvature of the segmental spherical surfaces 22 and 23 are in the plane of the optic axis. As in the previous embodiment apertured mask 12 is positioned in the region of focus of mirror 22 for demodulating the phase modulated information in the reflected light.

Figure 6:
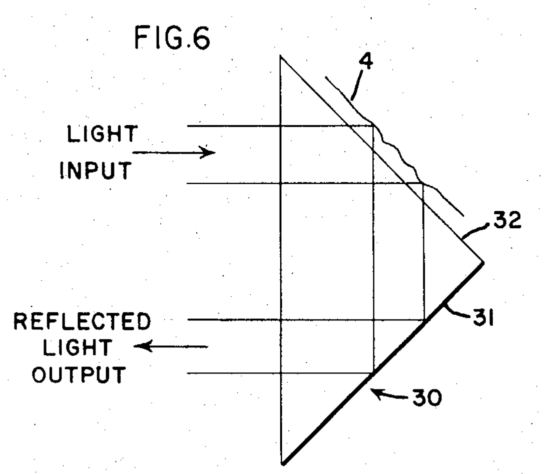
FIGURE 6 illustrates an embodiment of the invention employing multiple internal reflections.

Referring to FIGURE 6, the light reflected from the positive slopes of the deformed recording surface of the medium 4 is intensity modulated in addition to being phase modulated by orienting a three sided prism 30 so as to provide a second oblique surface 31 of opposite slope to that of the first oblique surface 32 which is overlaid by the recording medium 4. Prism 30 may be of a unitary construction as shown or may be composed of a pair of prisms of the type illustrated in FIGURE 3, including an upper and a lower prism. Surface 31 receives reflected light from the positive slopes of the recording surface at angles of incidence less than critical. Therefore light reflected from the positive slopes is selectively reflected and refracted by surface 31 in accordance with the deformation angle of said positive slopes. Because of the geometry of the construction, light reflected from the negative slopes of the recording surface is incident at surface 31 at angles that exceed the critical angle and will be totally reflected by surface 31. Thus, all of the light passing through the exit surface is modulated in intensity and phase in accordance with the surface deformation of the recording medium. The remaining components of the system may be similar to those employed in FIGURE 3 and are not illustrated.

The characteristic for prism 30 of the relative reflected energy output vs. angle of incidence at the recording surface of the medium 3 is shown in FIGURE 2B. This characteristic is essentially that of a spatial band-pass filter having a flat response between 41.8° and 51.8° and falling off sharply at either end. The lower cut-off of the characteristic is determined solely by the refractive index of the recording medium. The upper cut-off of the characteristic may be determined by the slope of the surface 31 or, if the prism 30 is of a two piece construction, by the refractive index of the lower prism, or by a combination of the two factors. When considering the employment of a moderately collimated light source it is desirable to equate the collimation angle to the pass band of the characteristic, as illustrated in FIGURE 2B. The collimation angle should not be less than the pass band in order to provide sensitivity at low deformation angles of the recording surface, and should not be greater than the pass band for a maximum light efficiency.

Figure 7:
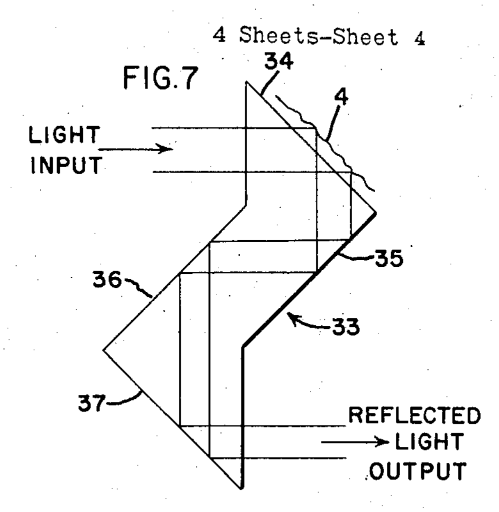
FIGURE 7 illustrates a further embodiment of the invention employing multiple internal reflections.

It may be appreciated that additional prism surfaces can be employed for further intensity modulating the light reflected from the positive and negative slopes of the recording surface. In FIGURE 7 a further embodiment of the present invention is shown employing a prism member 33 having four oblique surfaces 34, 35, 36 and 37 wherein 34 and 35 correspond to surfaces 32 and 31, respectively, of FIGURE 6. In accordance with the principles set forth with respect to FIGURE 6, surfaces 36 and 37 provide a further intensity modulation of light reflected from the positive and negative slopes, respectively, of the recording medium 4. The relative reflected energy vs. angle of incidence characteristic for prism member 33 has steepened skirts, as indicated by the dashed lines in FIGURE 2B, which provides improvement in sensitivity in the displayed information.

Figure 8:
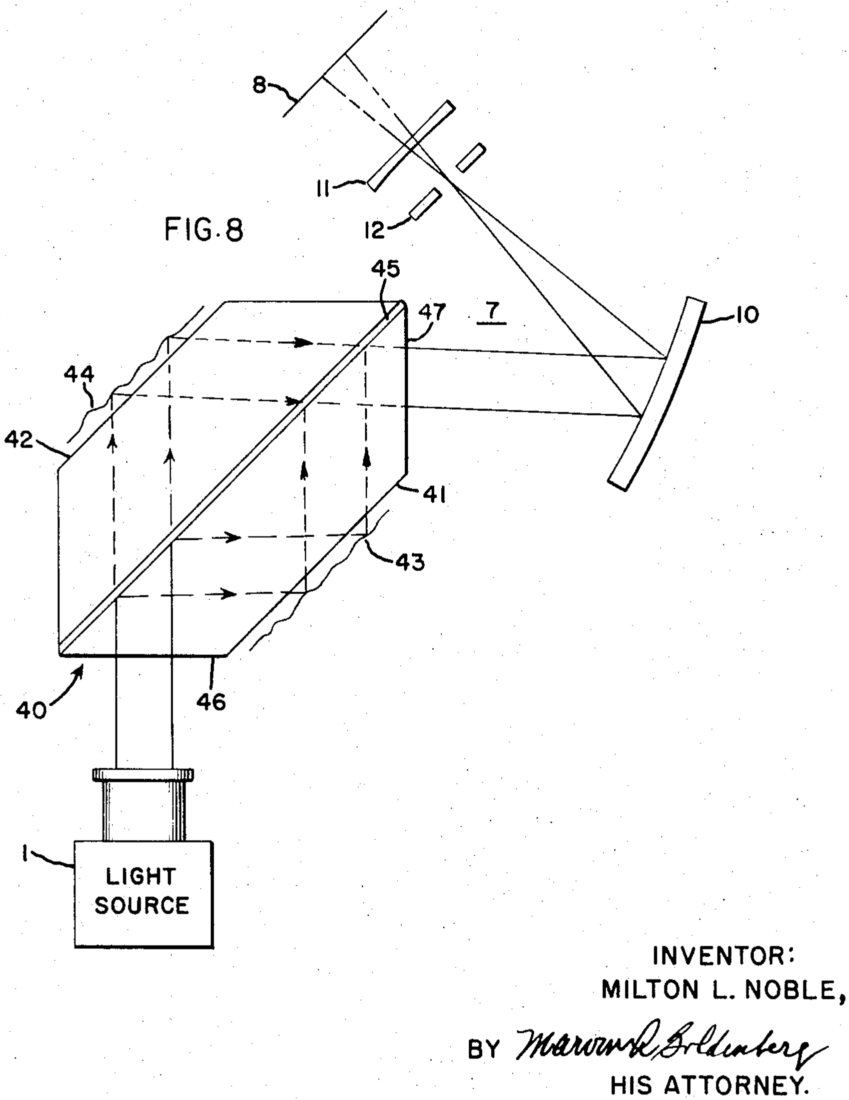
FIGURE 8 illustrates an embodiment of the invention for displaying multiple images.

In FIGURE 8 there is shown another embodiment of the present invention in which a pair of recorded images are superimposed on the display screen. A prism 40 in the shape of an eight-sided prism, essentially a pair of dove prisms joined at the base surfaces, is employed having two parallel oblique surfaces 41 and 42 on which are overlaid, respectively, two deformable recording layers 43 and 44. The prism 40 is illustrated in a side elevation. A thin film interference filter 45 is contained in a plane parallel to said oblique surfaces 41 and 42 which bisects the prism 40. The interference filter 45, which is of a conventional construction, transmits one half of the energy of the emitted light beam from source 1 and reflects the other half of the energy. Thus, a beam splitting and recombining function is performed by the filter. The remaining components of the system may be similar to those employed in FIGURE 3.

Projected light enters the prism 40 at the entrance surface 46 at an angle normal to said surface. Half of the light energy may be transmitted by the interference filter 45 and half reflected. For example in the embodiment under consideration the blue and green wavelengths are transmitted by filter 40 and the red and yellow wavelengths are reflected. The reflected energy strikes the undeformed surface areas of the first recording medium 43 at approximately the critical angle, as described with respect to the embodiment of FIGURE 3. As before, light is selectively reflected and refracted at the boundary of the recording surface of medium 43. The reflected portion is directed towards the interference filter 45 and is again reflected so as to exit through the surface 47 of the prism. The transmitted blue and green wavelengths strike the undeformed surface areas of the second recording medium 44 at approximately the critical angle. Light is selectively reflected and refracted from the surface in accordance with the deformations and directed back through the interference filter and out at the exit surface 47 to be combined with the light reflected from recording medium 43. The correction lens system 7 projects the combined light onto the screen in a superimposed relationship. It is a requirement that the prism construction provide equal path lengths for the light reflected from corresponding points of equal deformation angles on the recording surfaces of media 43 and 44. The principles of operation of this embodiment are otherwise the same as with respect to that of FIGURE 3 and need not be further described.

The presented embodiment provides considerable flexibility in the formation of a projected image. Accordingly, the first recorded image may be in the form of a static information and the second in the form of a dynamic information. For PPI displays, for example, the static information may provide a topographical map of an observed area and the second recorded image may provide information with respect to moving targets in said area. The recording media 43 and 44 may be of the same form, for example, both an oil film or both a thermoplastic tape, or each may be of different form where the most favorable characteristics of each recording medium are utilized to advantage. In addition, other than deformable recording media can also be employed, as is discussed subsequently.

In addition, the embodiment of FIGURE 8 can be employed to provide a two color projection system wherein the emitted light entering prism 40 is composed of two discrete color components, one of such wavelength as to be reflected by the interference filter 45 and the other of such wavelength as to be transmitted. For such scheme, if we consider red and green wavelengths to be emitted by source 1, red being reflected and green transmitted, the first and second recording media 43 and 44 will have an image recorded thereon which conforms, respectively, to the red and green information of a complete image. Accordingly, the red and green light components will be modulated, respectively, by the recording surfaces of the first and second recording media 43 and 44 and will be projected on the screen as a superimposed two-color image.

Although the projection systems of the present invention have been described primarily with respect to deformable recording media, the systems are also applicable to other forms of recording media for projecting a high brightness image of good contrast. For example, recording media having light scattering properties can readily be employed. One such medium has an ultra-violet sensitive plastic emulsion which releases small quantities of nitrogen gas in response to ultra-violet light, the gas expanding with heating to form tiny bubbles. The bubble density is in accordance with the ultra-violet light intensity and provides a scattering of the projected light. Such media can be readily substituted for deformable recording medium in the disclosed systems and operation is similar to that previously described. Thus, where no bubbles are present projected light will be incident upon the external surface boundary at approximately the critical angle and is totally reflected at said boundary to produce a bright element on the display. In portions where bubbles are present light is deflected and strikes the boundary at angles off critical, and is therefore reflected in accordance with the scattering properties of the medium.

Another form of medium that can be employed in the systems of FIGURES 3, 5 and 8 provides a variation in the indexes of refraction of elemental portions of the medium in accordance with a modulated electrical surface charge. Projected light is incident at the boundary at a fixed angle and is reflected in accordance with the modulated indexes of refraction of the medium.

In addition density modulated media, such as ordinary photographic film, are also compatible with the systems of FIGURES 3, 5 and 8, resulting in a display of greater contrast than is obtained in conventional projectors. For such application light is made incident at the critical angle or greater so that all of the incident light is totally internally reflected at the emulsion surface of the photographic film. An improved contrast results because light traverses the medium twice and is twice density modulated. It may be appreciated that for such application spatial filtering of the reflected light is not required.

Although the invention has been described with respect to a number of exemplary embodiments which illustrate basic constructions and principles of operation, it is not intended to be so limited and it is recognized that numerous modifications may be made by those skilled in the art which do not exceed the basic invention herein taught. For example, whereas only a single spatial filtering aperture in combination with a single light source have been illustrated, the invention has application to projection systems employing multiple aperture and multiple primary light source arrangements. Thus, in a multiple source, multiple aperture system each aperture of said multiple arrangement may be positioned in the focal region of a corresponding primary source.

The appended claims are intended to be construed as embodying all modifications that come within the true scope of the invention.

What I claim as new and desire to secure by Letters Patent of the United States is:

1. A light projection system comprising:

(a) a light permeable solid prism means having an entrance surface, an exit surface and a further surface integrally disposed with respect to said entrance and exit surfaces, (b) a light modulating control medium overlaying said further surface and forming a boundary with a second medium, said prism means and said control medium having approximately equal indexes of refraction, said second medium having a relatively low index of refraction, said boundary being normally oriented with respect to the critical angle for total internal reflection so as to effect total internal reflection for light rays incident thereon from the entrance surface, (c) means for directing light through the entrance surface of said prism at said boundary, the light reflected at said boundary being modulated in accordance with the modulation characteristics of said control medium, the internally reflected light exiting from said exit surface, and (d) means for projecting the internally reflected light received from said exit surface upon a display area.

2. A light projection system as in claim 1 wherein said control medium is composed of a deformable material.

3. A light projection system as in claim 1 having an optic axis that is approximately orthogonal to the plane of said boundary wherein said means for projecting includes a correction lens arrangement including a corrective mirror for correcting off axis distortion of said reflected light by projecting said reflected light in a direction approximately parallel to said optic axis onto said display area.

4. A light projection system as in claim 3 wherein said correction lens arrangement includes a spatial filter positioned between said mirror and said display area, for selectively transmitting said reflected light as a function of the angle of reflection at said boundary.

5. A light projection system as in claim 1 wherein said prism means comprises an additional surface obliquely disposed with respect to said entrance and exit surface which intersects said further surface at an angle such that light reflected from said boundary is provided with an additional internal reflection at said additional surface in accordance with the modulation characteristics of said control medium.

6. A light projection system as in claim 5 wherein said prism means comprises second and third additional surfaces which are arranged in parallel with said further surface and said an additional surface, respectively, so as to provide successive additional internal reflection of light reflected from said an additional surface in accordance with the modulation characteristics of said control medium.

7. A light projection system comprising:

(a) a plurality of light modulating control media each including a first surface and an opposing base surface, the first surfaces providing first and second boundaries between the control media and a further medium having an index of refraction lower than that of said control media, said boundaries being normally oriented with respect to the critical angle for total internal reflection so as to effect total internal reflection for light rays incident thereon through the respective opposing base surfaces, (b) first means for directing light of a first characteristic through the base surface of one control medium at said first boundary, the light reflected at said first boundary being modulated in accordance with the modulation characteristics of said control medium and for directing light of a second characteristic through the base surface of a second control medium at said second boundary, the light reflected at said second boundary being modulated in accordance with the modulation characteristics of said medium, said first means combining the light reflected from the boundaries of said control media and providing about equal path lengths for reflected light from corresponding points of said boundaries, and (c) means for projecting said reflected light upon a display area in a superimposed relationship.

8. A light projection system as in claim 7 having an optic axis that is approximately orthogonal to the planes of said boundaries wherein said means for projecting includes a correction lens arrangement including a corrective mirror for correcting off axis distortion of said reflected light by projecting said reflected light in a direction approximately parallel to said optic axis onto said display area.

9. A light projection system as in claim 8 wherein said correction lens arrangement includes a spatial filter positioned between said mirror and said display area, for selectively transmitting said reflected light as a function of the angle of reflection at said boundaries.

10. A light projection system as in claim 7 wherein said first means includes a light permeable solid prism means having an index of refraction approximately equal to the index of refraction of said control media, said prism means having an entrance surface, an exit surface, a pair of oblique surfaces in facing relationship and an optical interference filter disposed between said oblique surfaces, said control media overlaying said oblique surfaces whereby light from said source enters said entrance surface at an angle approximately normal to said surface, is split by said interference filter and upon being reflected at said boundaries is recombined so as to pass through said exit surface.

11. A light projection system as in claim 10 wherein said light modulating control media are composed of a deformable material.

References Cited

UNITED STATES PATENTS

| | | | |
|---|---|---|---|
| 2,391,450 | 12/1945 | Fischer | 178—7.87 |
| 2,489,835 | 11/1949 | Traub | 178—7.88 |
| 3,093,705 | 6/1953 | Glenn | 88—61 |

FOREIGN PATENTS

| | | |
|---|---|---|
| 233,547 | 4/1961 | Australia. |
| 906,578 | 3/1954 | Germany. |
| 473,804 | 3/1929 | Germany. |

OTHER REFERENCES

A.P.C. Application of H. W. Paehr, Ser. No. 354,771, published May 18, 1943. 178–7.5D JEWELL H. PEDERSEN, *Primary Examiner.*

RONALD L. WIBERT, *Examiner.*

UNITED STATES PATENT OFFICE

CERTIFICATE OF CORRECTION

Patent No. 3,357,299 December 12, 1967

Milton L. Noble

It is hereby certified that error appears in the above numbered patent requiring correction and that the said Letters Patent should read as corrected below.

Column 11, line 57, after "said" insert -- first --; column 12, line 4, after "said" insert -- second control --.

Signed and sealed this 4th day of March 1969.

(SEAL)
Attest:

Edward M. Fletcher, Jr.
Attesting Officer

EDWARD J. BRENNER
Commissioner of Patents